Jan. 14, 1936.    G. SPATTA    2,027,406
FORGING MEANS
Original Filed Feb. 21, 1930    6 Sheets-Sheet 1

Fig. 1.

Jan. 14, 1936.　　　　　G. SPATTA　　　　　2,027,406

FORGING MEANS

Original Filed Feb. 21, 1930　　6 Sheets-Sheet 2

Inventor:
George Spatta

Jan. 14, 1936. G. SPATTA 2,027,406
FORGING MEANS
Original Filed Feb. 21, 1930 6 Sheets-Sheet 4

Jan. 14, 1936.     G. SPATTA     2,027,406

FORGING MEANS

Original Filed Feb. 21, 1930    6 Sheets-Sheet 5

Inventor:
George Spatta

Patented Jan. 14, 1936

2,027,406

UNITED STATES PATENT OFFICE 2,027,406

FORGING MEANS

George Spatta, Buchanan, Mich., assignor to Clark Equipment Company, Buchanan, Mich., a corporation of Michigan Application February 21, 1930, Serial No. 430,206
Renewed March 1, 1935

6 Claims. (Cl. 78—63)

This invention relates to means for forging the ends of a banjo type rear axle housing.

In my copending application, Serial No. 416,537, filed December 26, 1929, issued as Patent No. 1,926,353 on September 12, 1933, I disclose a method of forming banjo type rear axle housing from a tubular blank.

The present invention relates specifically to a step in the method outlined in the above mentioned copending application, the particular step performing the flanging operation on the ends of the housing to form a receptacle for the bearing by which the axle is supported in the housing and a mounting plate for the brake drums that are to be mounted on the housing.

The forging of the ends of the blank from which the housing is made occurs after the banjo section of the housing has been formed and finished, and the operation is therefore one of the last to be performed on the blank during its fabrication. The method of forming the step in the operation of forming the flanges on the end of the tubular blank is disclosed in my copending application Serial No. 534,747, filed May 4, 1931, which is a division of the instant application and to which application reference is here made for those details.

The end of the blank is heated to forging temperature, and it is then inserted in a forging machine. The blank is preferably gripped by a clamping member engaging the tubular part of the blank between the throat of the banjo section and the end that is to be forged. With the blank so gripped in the machine, the heated end section that is to be forged projects into a stationary die disposed with its axis in alignment with the axis of the gripping member.

A movable punch registering with the die is advanced to engage the blank and shape it in accordance with the external contour of the punch and the internal contour of the die. The clamping member is then released and the blank dropped to a second clamping member which is closed to engage the same tubular part of the blank. The end of the blank again projects into a stationary die and a movable punch is brought into registration with the blank and die to perform a second step of the forming operation. After the second step is completed, the blank is dropped into a third clamping member which is closed about the tubular portion of the blank, and a movable punch is brought into registration with the blank and the stationary die to perform the third and finishing operation on it.

The gripping of the tubular part of the blank adjacent the point that is to be forged is depended on to prevent the blank from slipping in the die during the forging operation.

For this reason the clamping members are accurately formed to conform to the external contour of the cylindrical part of the blank, and are closed with sufficient pressure to firmly clamp the housing. The pressure exerted on the blank by the clamping member is exerted radially of the blank and is applied completely around the circumference of the blank so that there is no danger of crushing the walls of the tubular section engaged by the clamp.

By proper design of the machine and positioning of the clamping members and dies so that they are readily accessible and the heated blank can be quickly inserted into them, I am able to perform the three forging operations on the blank before it has cooled sufficiently to necessitate its being reheated. This, of course, reduces the total time required for the completion of the axle housing and makes the cost of the operation reasonably low.

In the preferred embodiment of the machine the clamping members and dies are formed into sections, one of which is stationary and firmly attached to the frame work of the forging machine. The other section of the dies and clamping members is mounted in a movable ram which moves transversely of the longitudinal axis of the clamping member in a motion that maintains the face of the movable member adjacent the working face of the stationary member always parallel to it.

The die ram is moved by a mechanical cam and lever arrangement, although this movement may be accomplished in any other preferred manner such as by a hydraulic means.

The movement punches are carried on a horizontally movable ram capable of motion longitudinally of the axis of the gripping member and operated by mechanical means in the preferred embodiment of the invention. If desired, the die carrying ram may also be operated in any other preferred manner such as by a hydraulic means.

The dies and punches employed in this operation must, of course, be different for every type and size of axle housing forged in the machine, that is there must be a set of punches and dies for each type of axle housing made in the shop. It is therefore imperative that the die structure and punch structure be of a design that permits them to be easily removed from the set up in the machine, so that when it is necessary to change the machine to make a different type of axle housing, the change can be made with a minimum of lost time.

Further objects of the invention will be best understood from a reading of the detailed description and claims which follow.

Now, to acquaint those skilled in the art with the teachings of my invention, reference is made to the accompanying drawings in which a preferred embodiment of it is shown by way of example and in which.

Figure 1:
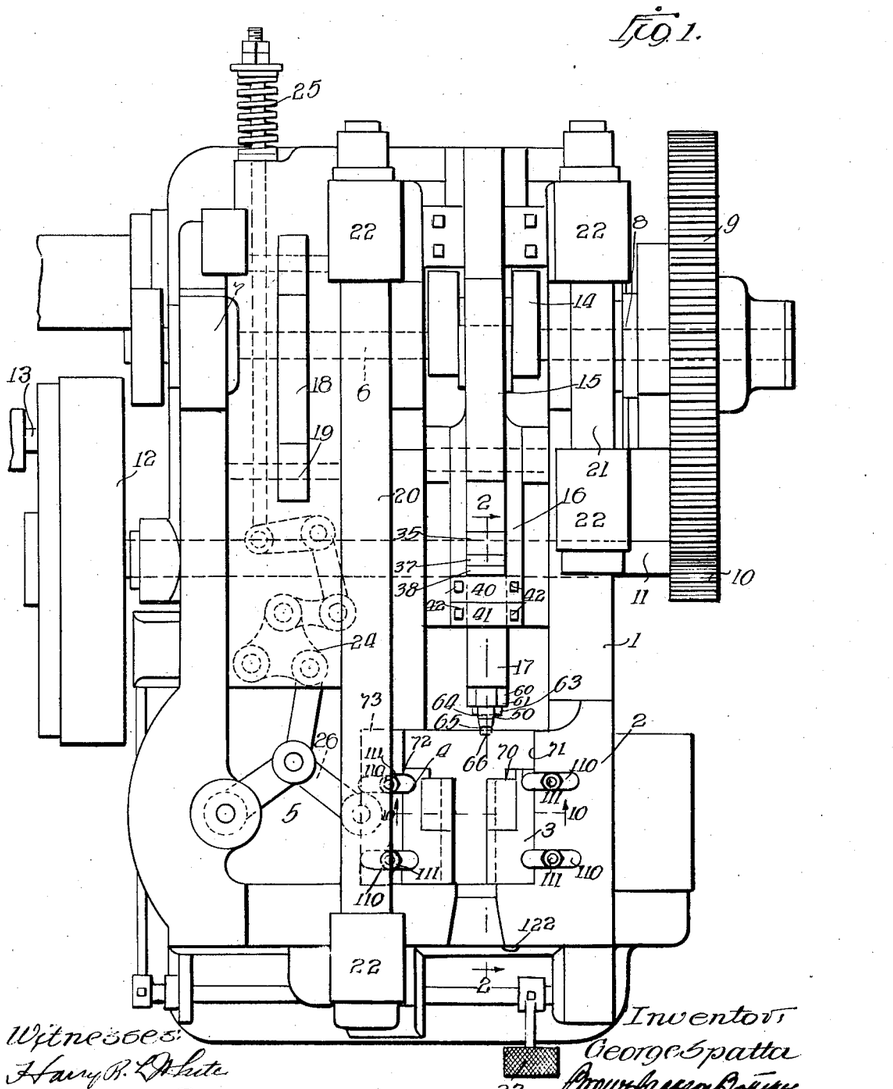
Figure 1 is a plan view of the completely assembled forging machine with the die structure in its open position.
Figure 2:
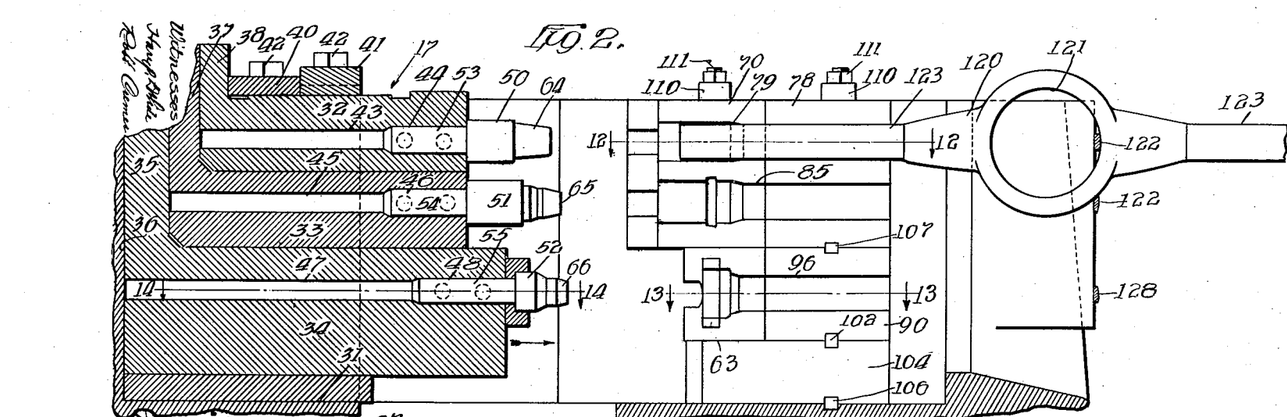
Figure 2 is a cross-sectional view taken substantially along the line 2—2 of Figure 1 showing a blank in its first position in the machine and with the punches in their normal position.

Referring to the drawings, now, in more detail, the machine comprises a framework 1 which is a clevis-like framework disposed with its open end upward. At the front end 2 of this framework are located the stationary die 3 and the movable die 4, together with the link mechanism indicated generally at 5, through which the movable die 4 is moved in a horizontal direction towards the stationary die 3.

In the back part of the machine, the main crank shaft 6 is supported in suitable bearings 7 and 8, and arranged to be driven by the gear 9 which meshes with the pinion 10. The pinion is keyed to the shaft 11 which runs transversely of the frame of the machine to the fly-wheel and clutch 12. An electric motor, not shown, is geared to the fly-wheel and clutch by a shaft 13 to drive the press.

The shaft 6 contains the crank arm 14 which is connected by connecting rod 15 to the movable ram 16 which ram carries the punches 17 in the manner which will be hereinafter pointed out. The shaft 6 also carries a cam 18 which engages the roller 19 through which the lever arrangement 5 is operated to close the movable die 4 against the stationary die 3.

The open ends of the framework of the machine are braced by rods 20 and 21 which are bushed in suitable bushings 22 and fastened therein in any preferred manner to enable them to hold the open end of the framework of the machine rigidly in place against the reactions set up by the operation of the movable ram 16.

The clutch which is included in the fly-wheel 12 is operated by a foot lever 23 located at the front side of the machine, this clutch being any preferred type of clutch capable of operating the machine through an entire cycle each time the foot lever 23 is pressed.

As shown, the lever 23 mechanically controls the clutch, this showing being made by way of example only, as any preferred type of control, such as a hydraulic or an electric control, may be substituted for the mechanical control shown, particularly since this feature is not of the essence of the present invention.

In the operation of the machine, the blank is placed against the stationary die, the machine is operated to move the movable die 4 against the blank to clamp it between that die and the die 3, and the ram 16 is moved forward in a horizontal direction to bring the punches 17 into engagement with the blank in the die.

Should the forces set up in the die structure exceed the maximum that the machine is capable of resisting, the lever and link arrangement 24 operates against the tension of the spring 25 to permit the toggle 26 to open and withdraw the movable die 4 from engagement with the stationary die 3, thereby releasing the work from the machine to prevent damage to the machine. The particular type of overload release shown in the drawings is old and well understood by those skilled in the art and is not of the essence of the present invention.

As will be best seen in Figures 2 to 6, the ram 16 is of generally rectangular cross-section and fits in the slot 30 in the framework 1 of the machine.

Figure 6:
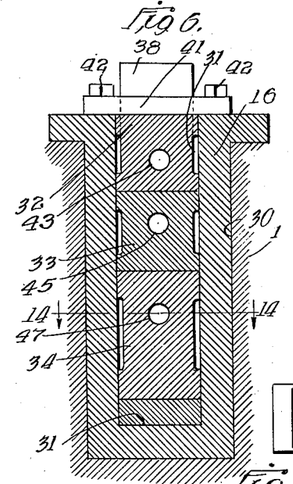
Figure 6 is an elevation view partly in section of the end of the movable ram showing the punch holders in place in it.

The ram 16 contains a rectangular slot 31 which is open on the top side of the ram and towards the die end of it. Fitted within this rectangular slot are the punch holders 32, 33 and 34, each of which comprises a rectangular main portion disposed horizontally in the ram and an upwardly projecting portion disposed at one of its ends. That is, the die holder 34 is provided with a projection 35 which fits against the back surface 36 of the slot 31, projecting slightly above the top surface of the ram. The die holder 33 is provided with a similar projection 37 which fits against the projection 35 of the holder 34, and the holder 32 is provided with a projection 38 which fits against the projection 37 of the holder 33.

The projections 35, 37 and 38 all extend above the upper surface of the ram, and are held in the ram by the plates 40 and 41 which are attached to the ram by bolts 42 and fitted over the open upper side of the slot 31 and against the projection 38 of the holder 32. By this arrangement the punch holders are securely held in the ram but at the same time they are readily removable therefrom.

The punch holder 32 is provided with a cylindrical slot 43 in the end of which is a counterbore 44, the diameter of the counterbore being larger than that of the slot 43. Similarly, the holder 33 is provided with a cylindrical slot 45 and counterbore 46, and the holder 34 with a cylindrical slot 47 and a counterbore 48. The counterbores serve as sockets into which the tongue portions of the punches are registered and held in the manner that will presently appear.

Figure 7:
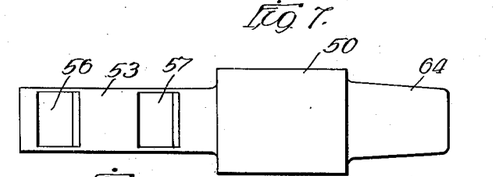
Figure 7 is a detail view of the punch employed in the first step of the process.
Figure 8:
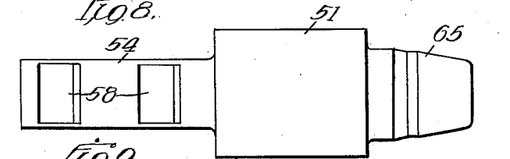
Figure 8 is a detail view of the punch employed in the second step of the process.
Figure 9:
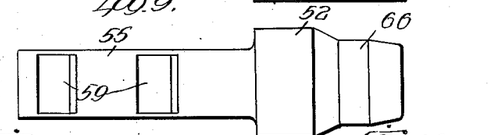
Figure 9 is a detail view of the punch employed in the third and last step of the process.

As will be seen in Figures 7, 8 and 9, the punches 50, 51 and 52 are provided with cylindrical tongue portions 53, 54 and 55, respectively. The tongue portion 53 of the punch 50 is provided with two wedge shaped slots 56 and 57 which are disposed with their deep end towards the body portion of the punch 50 and their shallow end toward the free end of the tongue 53. Similarly, the tongue 54 of the punch 51 is provided with a pair of wedge shaped slots 58 that are similarly located, and the tongue 55 of the punch 52 with a pair of wedge shaped slots 59 also located in the same manner.

Figure 3:
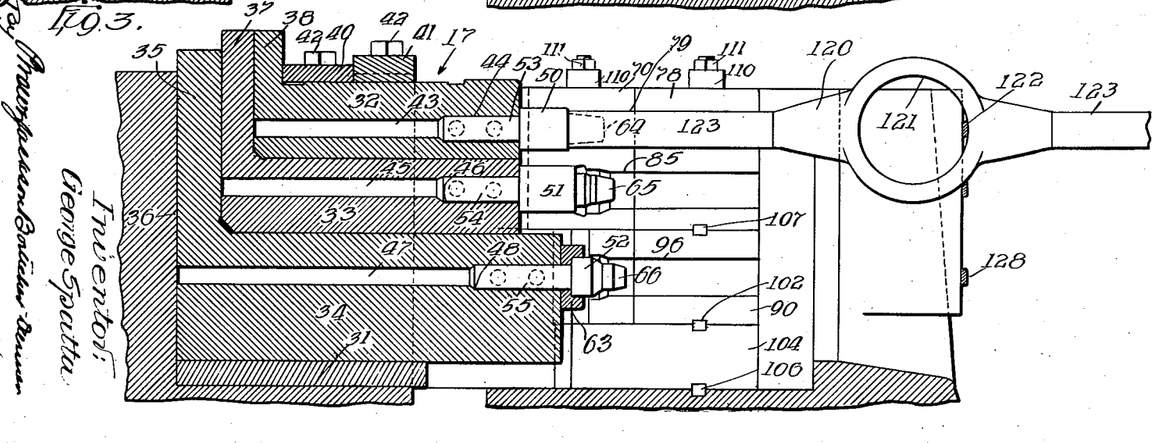
Figure 3 is a view similar to Figure 2 showing the punches in their closed position engaging the blank.
Figure 14:
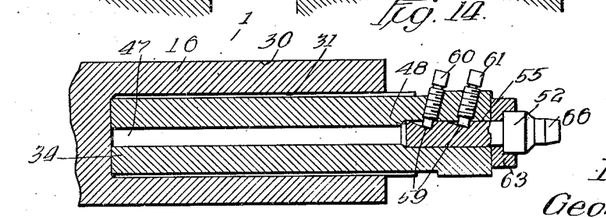
Figure 14 is a cross-sectional view taken substantially along the line 14—14 of Figure 6 showing the method of locking the punch in the punch holder.

As will be seen in Figures 3 and 14, the tongue 55 of the punch 52 fits into the counterbore 48 and set screws 60 and 61 are projected through the holder 34 at an angle normal to the surface of the wedge shaped slot 59 in the tongue. By tightening the set screws 60 and 61 against the surface of the wedge shaped slot 59, the tongue 55 is drawn into the counterbore and the punch thereby securely fastened in the punch holder. The punch 52 is provided with a hardened forming plate 63 through which the tongue 55 extends, and this plate is also held in position on the surface of the holder by the set screws 60 and 61 and their engagement with the tongue 55.

The punches 50 and 51 are held in the holders 32 and 33, respectively, by set screws, not shown, similarly projected and engaging the sloping surfaces of wedge shaped slots 56, 57 and 58.

The working end of the punch 50 is provided with a conical portion 64, the shape of which conforms to the desired shape of the interior surface of the blank, and the working end of punch 51 is similarly provided with a formed conical section 65, and the working end of punch 52 with a conical section 66, both of which conform to the shape to which it is desired to form the interior surfaces of the blank that is to be operated on in the machine.

As will be seen in Figures 1, 10, 11, 12 and 13, the die comprises a stationary die member 70 which is fitted into the rectangular socket 71 in the framework 1, and the movable member 72 which is supported on the transversely movable ram 73 which in turn is supported in the slot 74 in the framework 1.

Figure 10:
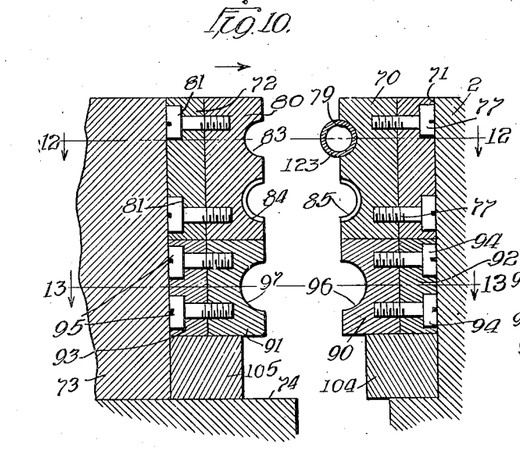
Figure 10 is a sectional elevation taken along the line 10—10 of Figure 1 showing the die and clamping structure in its open position.

In one end of the stationary die is a hardened insert 75 set in a pocket 76 and held therein by screws 77.

A clamping slot 78 and a forming slot 79 are formed in the flat working surface of the die 70 and forming block 75, respectively. These slots constitute one half of the clamp and forming die, respectively.

Figure 11:
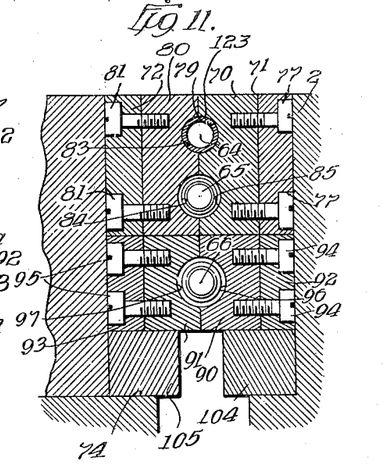
Figure 11 is a view similar to Figure 10 showing the die and clamp structure in its closed position.
Figure 12:
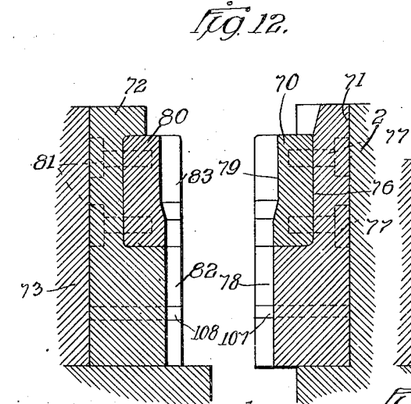
Figure 12 is a cross-sectional view taken along the line 12—12 of Figure 10 looking in the direction of the arrows.

The other half of the clamp and forming die is formed in the member 72, the hardened forming block 80 being held therein by screws 81 in a manner similar to which the insert 75 is held in the die block 70. A clamping slot 82 and a forming slot 83 are likewise formed in the working surface of the movable die 72, and when that die is closed against the die 70, the slot 82 cooperates with the slot 78 to form a cylindrical opening of dimensions equal to the external dimension of a tubular portion of the blank that is to be forged in the machine.

The forming slot 79 cooperates with the forming slot 83 to form the external surface of the blank when it is operated on by the punch in the machine.

As will be seen in Figures 10 and 11, the inserts 75 and 80 also contain a second set of forming slots 84 and 85 disposed below the slot 83 and 79 with their axes in alignment. Corresponding clamping slots, not shown, are formed in the blocks 70 and 72 so that the tubular portion of the blank may also be gripped when the blank is inserted in the die formed by members 84 and 85.

Figure 13:
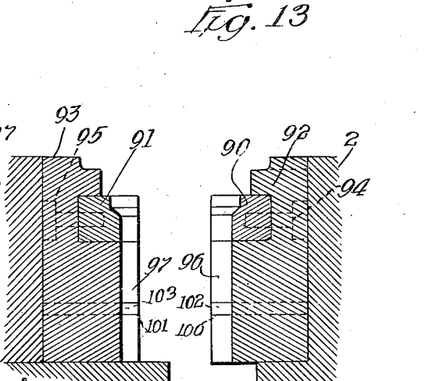
Figure 13 is a cross-sectional view taken along the line 13—13 of Figure 10 looking in the direction of the arrows.

As will be best seen in Figures 10 and 13, a stationary die block 92 is located below the stationary die block 70, and a movable die block 93 is similarly located below the movable die block 72. In the die blocks 92 and 93 are the hardened metallic inserts 90 and 91, respectively, being held therein by screws 94 and 95. It will be observed that the hardened inserts 90 and 91 are shorter than the inserts 75 and 80, this arrangement being preferable since the blank has been shortened by the operation performed on it before it is positioned in the lower die. The lower die is also provided with slots 96 in the stationary block 92, and 97 in the stationary block 93 which, together, form a cylindrical slot that exerts radial pressure on the blank to hold it in the die during the forging operation.

The entire reaction set up in the blank in opposition to the pressure exerted on it by the moving punch is transmitted to the die block through the gripping action of the clamping members and the tubular portion of the blank.

It is therefore necessary that the clamping members be securely fastened in place in the machine against the likelihood of longitudinal displacement under the force of this reaction. To this end, the lower die members 92 and 93 are provided with transversely disposed rectangular slots 100 and 101 into which are fitted rectangular keys 102 and 103, which, together key the die blocks to the mounting plates upon which they are located. In the embodiment of the invention shown, spacing blocks 104 and 105 are located beneath the dies 92 and 93, these blocks being keyed to the machine in a similar manner by keys 106 so that each spacing block is thereby securely locked in place in the machine.

The upper surfaces of the dies 92 and 93 are likewise provided with transverse rectangular slots in which the keys 107 and 108 are located and registered with transverse rectangular slots in the die blocks 70 and 72, respectively, to hold those blocks in fixed relation with respect to the die blocks 92 and 93. The upper die blocks 70 and 72 are held down on the lower die blocks in any convenient manner, such as by brackets 110 which are clamped down on the stationary portion of the machine and the top of the dies by bolts 111, this arrangement securely holding the dies in place and at the same time permitting their ready removal when the occasion arises.

In the operation of the machine, the blank 120 is placed in the upper die and positioned therein by bringing that portion of the perimeter of the banjo 121 furthermost from the end of the blank being operated on into engagement with the guide pin 122 located on the forward part of the machine. This engagement with the guide pin 122 determines accurately the distance at which the bearing seat and brake plate are formed with respect to the center of the banjo of the axle housing, so as to insure that the operations performed upon the two ends of the blank will be equally spaced from the banjo portion of the housing. This prevents any inequality in the formation of the blank, and provides for proper alignment thereof.

Figure 15:
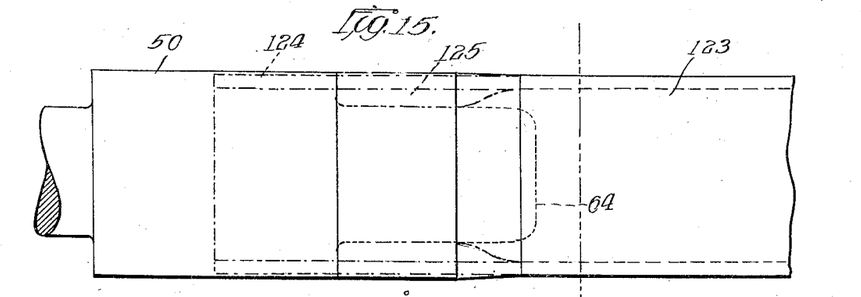
Figure 15 is a plan view showing the blank at the end of the first stage of the operation in solid lines and at the beginning of the first stage of the operation in dotted lines.
Figure 16:
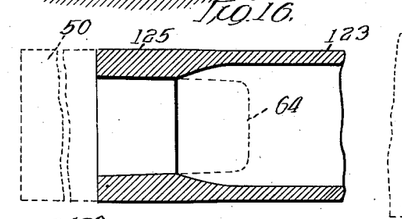
Figure 16 is a cross-sectional view of the blank showing the punch at the end of the first step of the process.

The machine is then operated to move the movable die structure, consisting of dies 72 and 93, in a horizontal direction to cause the clamping members of that die to engage the tubular portion 123 of the blank and thereby securely grip it by radial pressure exerted on the walls of the blank. The machine is then operated to cause the ram 16 to advance and bring the punch 50 into engagement with the end of the blank, that end being disposed within the die inserts 75 and 80 in the die block. The end 64 of the punch fits inside of the tubular blank and through the operation of the punch the end section 124 of the blank, Figure 15, is upset back to form a thickened wall section 125.

The diameter of the die is slightly greater than the diameter of the blank 120, and the outside diameter of the thickened end portion 125 is increased slightly by this operation.

Figure 4:
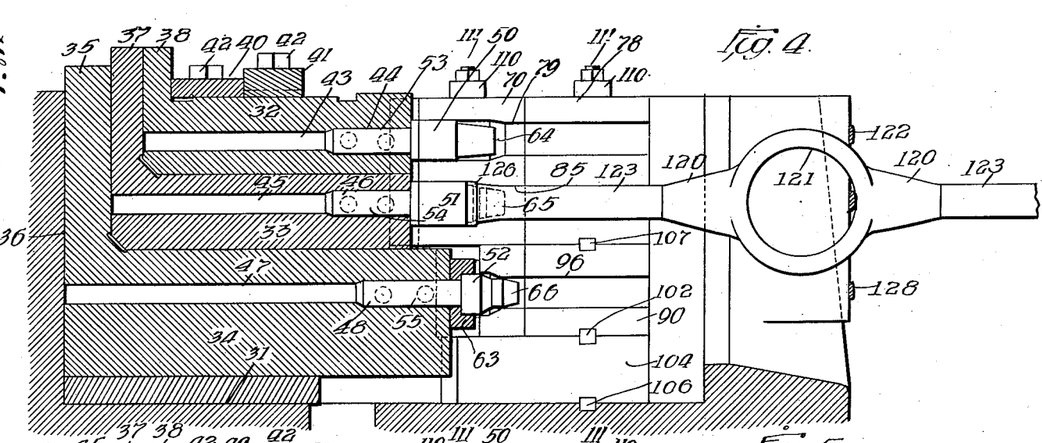
Figure 4 is a view similar to Figure 2 showing the blank in the second die and showing the punch in its closed position engaging the blank.
Figure 5:
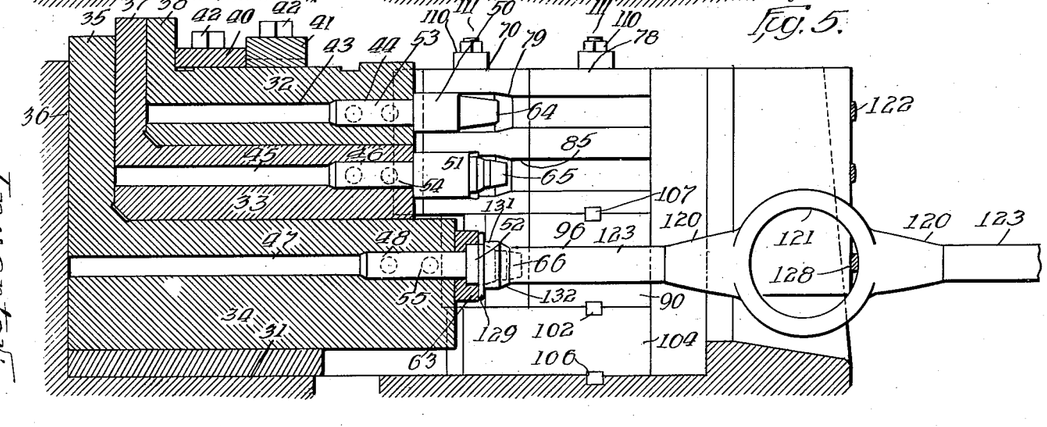
Figure 5 is a view similar to Figure 2 showing the blank in the third die and the punch closed in engagement with that blank.

When the ram 16 has completed its forward movement and brought the punch 50 into registration with the die, the ram reverses and travels back into the position in which it is shown in Figure 1. The movable die is then backed off away from the stationary die and the blank dropped down into the second die structure in which it is shown in Figure 4. The movable dies are again advanced to close against the cylindrical section 123 of the blank and the ram 16 is again advanced to bring the punches into registration with the die.

Figure 17:
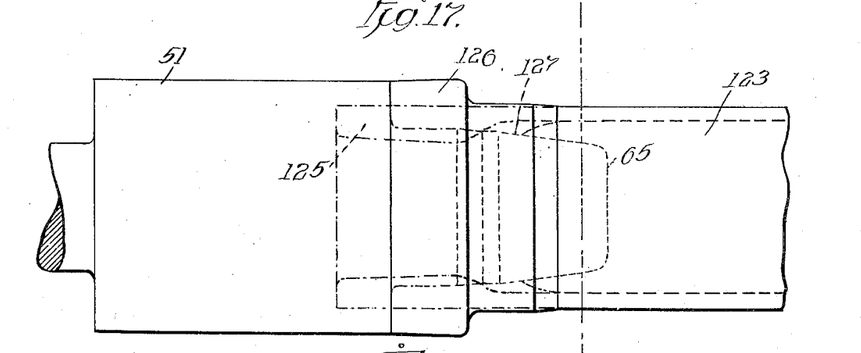
Figure 17 is a plan view of the blank showing it at the end of the second step in solid lines and at the beginning of the second step in dotted lines.
Figure 18:
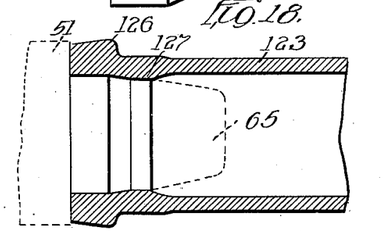
Figure 18 is a cross-sectional view through the blank shown in Figure 17 showing the punch at the end of the second step in the process.
Figure 19:
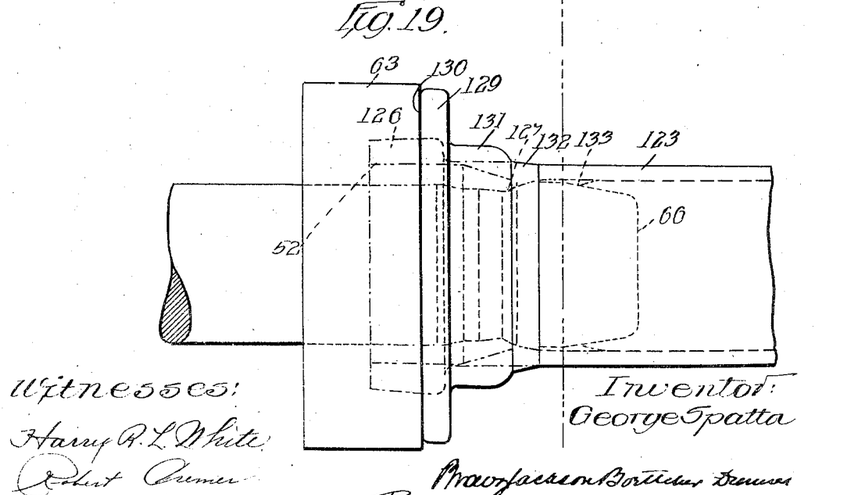
Figure 19 is a plan view of the blank showing the flange at the end of the third step in solid lines and at the beginning of the third step in dotted lines.
Figure 20:
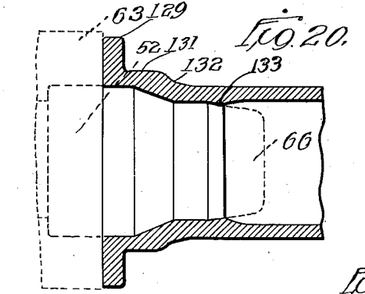
Figure 20 is a cross-sectional view through the blank shown in Figure 19 showing the position of the punch at the end of the third step of the process.
Figure 21:
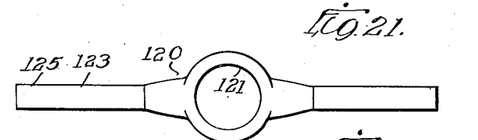
Figure 21 is a plan view of the blank showing it at the end of the first step of the process.
Figure 22:
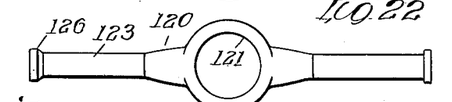
Figure 22 is a plan view of the blank at the end of the second step of the process.
Figure 23:
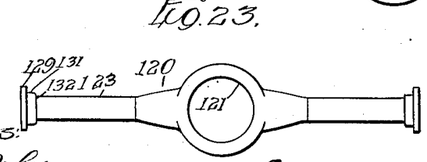
Figure 23 is a plan view of the blank showing it at the completion of the third step in the process.

As will be seen in Figure 17, the punch 51 engages the thickened end portion 125, shown in dash-dot lines in the figure, and folds the metal in that section outward to form a flange 126. A portion of the metal inside of the blank 123 is pushed inward by this operation to extend the increased thickness of the wall inward of the blank as shown at 127.

When the punch has completely registered with the die, the movement of the ram is again reversed and the movable die again operated to open the die structure and release the clamped blank therefrom. The blank is then lowered and its banjo registered with the pin 128 to properly position it in the lower die of the machine. The ram 16 is again advanced to bring the punch 52 into registration with the blank, this operation expanding the flange 126 of the blank outward to form a flange 129 which is thinner and of larger diameter. The forming block 63, which is held on the punch holder by the punch 52 in the manner hereinbefore explained, engages the flange 126 to form it into the flange 129 and, since this member 63 is hardened and ground smooth, the outer surface 130 of the flange 129 is finished flat and smooth.

The punch 52 presses the wall of the blank out into the die to form the collar portion 131 which is joined onto the tubular portion 123 of the blank by a conical section 132, and the wall adjacent this conical section is thickened slightly as shown at 133.

After the punch has been brought into registration with the die, the movement of the ram is again reversed and the movable die backed off to release the blank from the machine.

This completes the forging of one end of the blank. The other end is then heated and the same operations performed on it.

This arrangement of punches and dies leaves the dies and clamping members readily accessible so that the blank may be quickly inserted in them, and the operation of the punches is sufficiently rapid to permit performing the three steps outlined during one heat of the blank, that is, the steps are performed in sufficiently rapid succession that all may be completed before the blank has had time to cool down sufficiently to require reheating to the proper forging temperature.

While I have chosen to show my invention in connection with a particular adaptation of it, I have done so by way of example only, as there are many modifications and adaptations which can be made by one skilled in the art without departing from the teachings of the invention.

Having thus complied with the statutes and shown and described a preferred embodiment of my invention, what I consider new and desire to have protected by Letters Patent is pointed out in the appended claims.

What is claimed is:—

1. In a forging machine, a movable ram containing a rectangular slot that is open on the end and top, a punch holder in the slot having a rectangular portion in the bottom of it and projecting through its open end and a projection extending over the closed end of the slot, a second punch holder fitted in the slot and against the first holder and its projection, said second holder also having a projection disposed against the first, a third holder fitted in the slot against the second and having a projection disposed against the projection of the second holder, plates on the ram spanning the open top of the slot and lying against the third holder and its projection to bind the holders in the ram, a punch secured in each holder, and a stationary die for each punch with which it registers when the ram is moved to one of its extreme positions.

2. In a forging machine, a horizontally movable ram having a slot opening towards its free end and top, an L shaped punch holder disposed in said slot with its short portion against the closed end of it, a second L shaped holder nested in the first with its short portion against the short portion of the first, a third L shaped holder nested in the second with its short portion against the short portion of the second, means for holding said holders securely in the ram, and a punch in each holder.

3. In a forming machine, a ram having a deep narrow slot therein, a plurality of working dies stacked one on top of the other in said slot, means associated with the respective dies for holding the dies against relative movement in the slot in at least one direction, and a plate across the top of the slot and cooperating with the top die to hold it against movement in the opposite direction, whereby the lower dies are held against movement in said opposite direction.

4. In a machine for upsetting the ends of the tubular arms of axle housings having a central enlarged banjo portion provided with an intermediate circular opening having its axis normal to the axis of said arms, a stationary die block, a second die block movable laterally against said first block to clamp one end of one of said arms therebetween, a die member having a punch portion adapted to be moved into register with said die blocks to upset the gripped end of said arm, and means spaced from said die blocks and engaging the remote portion of the periphery of said banjo opening to limit inward movement of said arm into engagement with said die blocks.

5. In a machine for upsetting the ends of the tubular arms of axle housings having central transverse openings, a stationary die block, a second die block movable against said first die block to clamp one end of said arms therebetween, a die member having a punch portion adapted to be moved into register with said blocks to upset the gripped end of said arm, and means spaced from the die blocks and engaging the defining wall of said opening to limit the position of said arm within said blocks whereby said upsetting operation will be performed at a predetermined distance from the center of said opening.

6. In a machine for upsetting flanges at the ends of the tubular arms of axle housings having central transverse openings, a stationary die means, a second die means movable against said first die means to clamp one end of said arms therebetween, a die member having punch means adapted to be moved into register with said die means to form a radial flange at the gripped end of said arm, and means spaced from the die means and engaging the defining wall of said opening to limit the position of said arm within said die means to gauge the distance from the center of the opening at which the radial flange will be formed, whereby each flange will be formed at a predetermined distance from the center of said opening.

GEORGE SPATTA.